United States Patent [19]

Greathouse

[11] 4,038,717
[45] Aug. 2, 1977

[54] CASTER MOUNTING STRUCTURE

[75] Inventor: Chester K. Greathouse, Sharonville, Ohio

[73] Assignee: The Hamilton Caster & Mfg. Company, Hamilton, Ohio

[21] Appl. No.: 709,948

[22] Filed: July 29, 1976

[51] Int. Cl.² .................................... B60B 33/00
[52] U.S. Cl. .................................. 16/29; 248/15; 280/79.1
[58] Field of Search ............... 16/29; 250/33.99 C, 250/79.1 R, 79.1 A; 296/102; 248/15, 22, 24

[56] References Cited

U.S. PATENT DOCUMENTS

| 1,785,064 | 12/1930 | Zeindler | 280/79.1 R |
| 2,502,929 | 4/1950 | Clark | 280/79.1 R |
| 3,027,680 | 4/1962 | Gallagher, Jr. | 16/44 |

FOREIGN PATENT DOCUMENTS 1,308,083  2/1973  United Kingdom ............... 16/29

Primary Examiner—Werner H. Schroeder
Assistant Examiner—Conrad L. Berman
Attorney, Agent, or Firm—James W. Pearce; Roy F. Schaeperklaus

[57] ABSTRACT

A mounting structure for a wheel mounting assembly such as a caster assembly having a mounting plate. Mounting blocks of viscoelastic rubber-like material are mounted on corners of the mounting plate. Each mounting block includes flanges which define a slot in which an edge portion of the mounting plate is received. Brackets attached to a support panel of a cart or the like supported by the caster assembly hold the flanges in compression against the faces of the mounting plate and against the panel so that the panel and the cart or the like are viscoelastically supported in spaced relation to a surface on which a wheel of the assembly runs.

7 Claims, 7 Drawing Figures

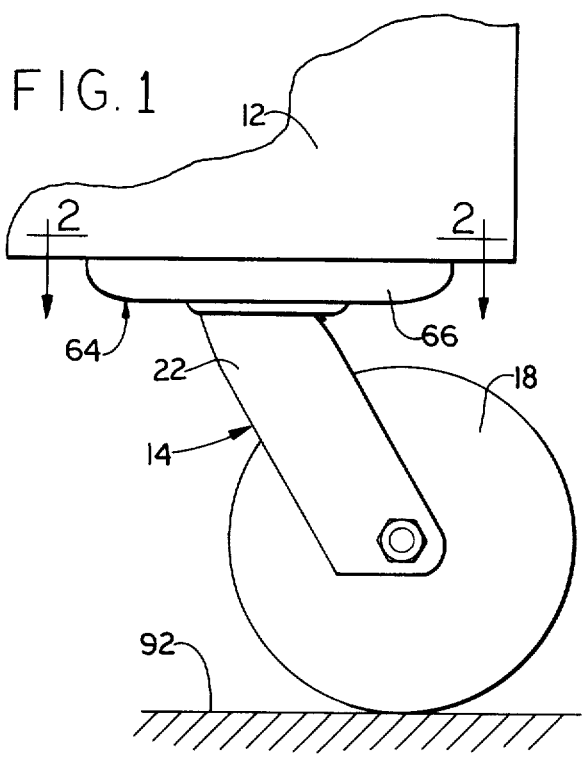
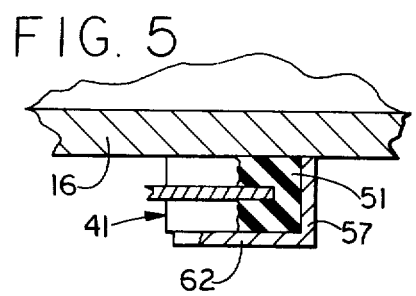
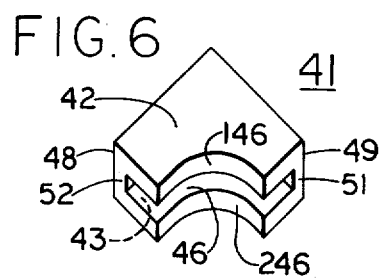
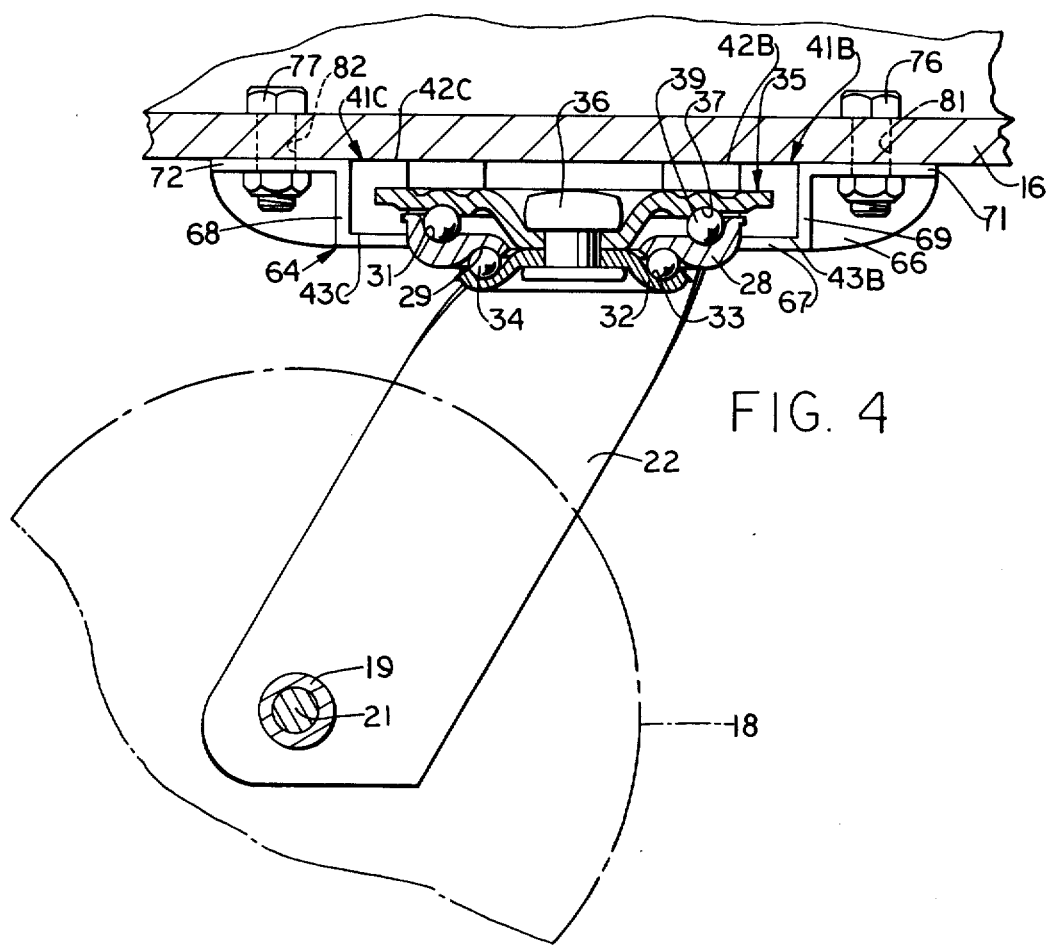

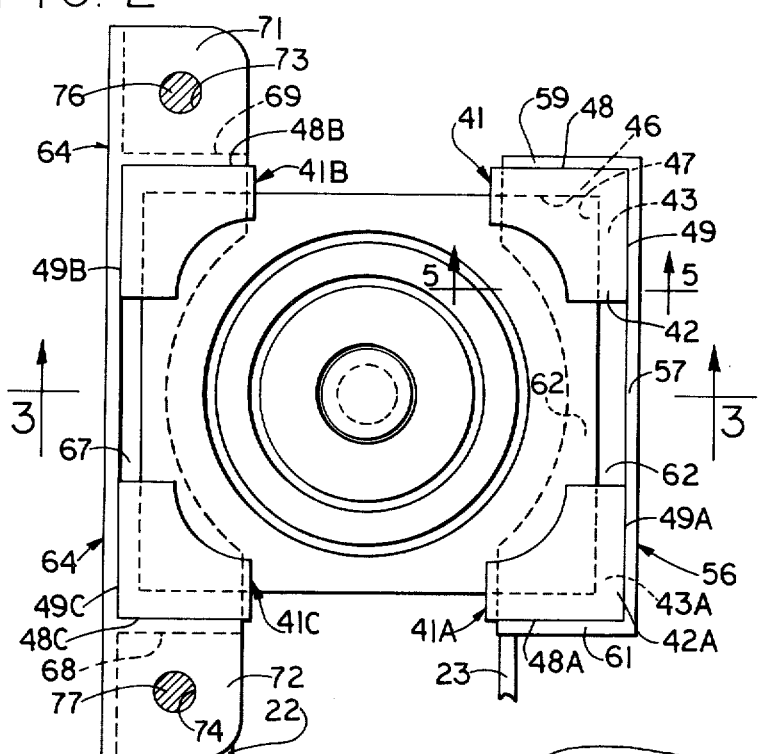
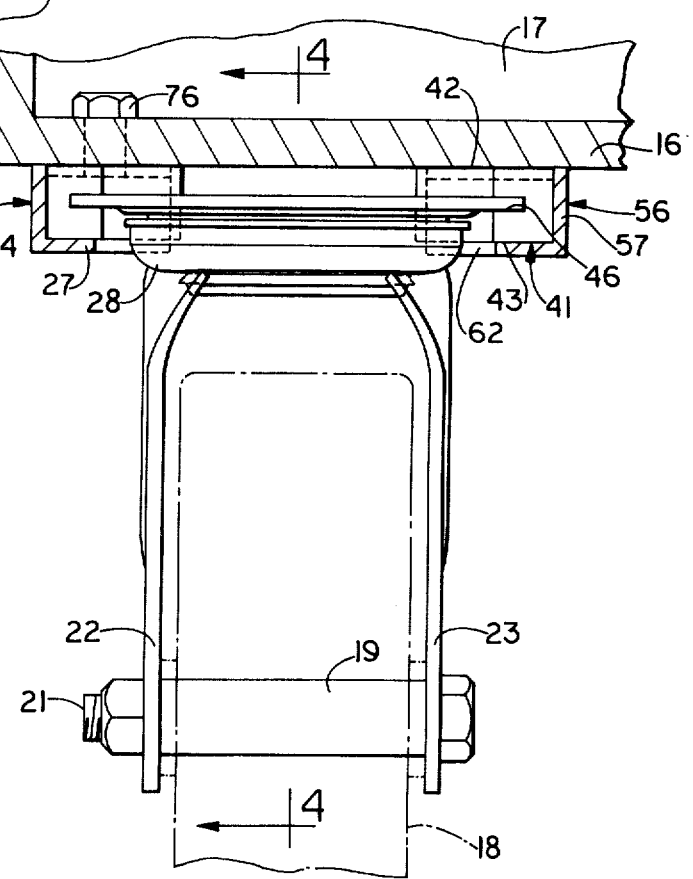

CASTER MOUNTING STRUCTURE

This invention relates to casters and the like. More particularly, this invention relates to a resilient mounting for a wheel rig such as a caster assembly.

An object of this invention is to provide a mount for a caster wheel rig which is resilient so that, as a cart or the like supported by the wheel rig is advanced, shock energy caused by any unevenness of a surface against which a wheel of the wheel rig rolls can be absorbed and partly released over an extended time space so as to reduce the magnitude of the force resulting from the shock effect.

A caster assembly for a cart is often provided with a mounting plate which is attached to the underside of a floor or supporting panel or the like of the cart to support the cart. A futher object of this invention is to provide a device for resiliently mounting a mounting plate for such a caster assembly below and substantially parallel to a support or floor panel of a cart.

Briefly, this invention provides a viscoelastic caster mounting arrangement in which a mounting plate of a caster assembly or wheel rig is supported by mounting blocks of viscoelastic material. The mounting blocks are mounted on opposed edge portions of the mounting plate. Each mounting block includes flanges on opposite sides of the mounting plate. Bracket means attached to a panel of a device on which the caster assembly is mounted hold the mounting blocks with one flange compressed between the mounting plate and the panel and the other flange compressed between the mounting plate and the bracket means so that the panel is viscoelastically held in spaced relation to a surface on which a wheel of the wheel rig runs.

The above and other objects and features of the invention will be apparent to those skilled in the art to which this invention pertains from the following detailed description and the drawings, in which:

FIG. 1 is a fragmentary view in side elevation of a cart supported by a caster having a mounting assembly constructed in accordance with what presently appears to be a preferred embodiment of this invention;

FIG. 2 is a fragmentary view in section taken on an enlarged scale on the line 2—2 in FIG. 1;

FIG. 3 is a fragmentary view in section taken generally on the line 3—3 in FIG. 2, a wheel being shown in dot-dash lines to reveal details of structure;

FIG. 4 is a fragmentary view in section taken on the line 4—4 in FIG. 3;

FIG. 5 is a fragmentary view in section taken on the line 5—5 in FIG. 2;

FIG. 6 is a view in perspective of a resilient mounting block of the assembly; and FIG. 7 is a bottom plan view of a bracket member of the assembly.

In the following detailed description and the drawings, like reference characters indicate like parts.

In FIG. 1 is shown a fragmentary portion of a cart 12. The cart is supported by a plurality of caster assemblies, one of which is shown at 14. The cart 12 includes a floor panel 16 (FIG. 4) and wall panels, one of which is indicated at 17.

The caster assembly 14 includes a caster wheel 18, which is rotatably mounted on a sleeve member 19 supported on a bolt 21. The bolt 21 spans bearing support arms 22 and 23 (FIG. 3). The bearing support arms 22 and 23 are mounted on a ring member 28. The ring member 28 is provided with a downwardly facing circular groove 29 (FIG. 4) and an upwardly facing circular groove 31. A lower ball supporting ring 32 is provided with an upwardly facing circular groove 33 which supports balls 34, which run in the grooves 29 and 33 and support the ring member 28. A substantially rectangular mounting plate 35 is attached to the lower ring 32 by a rivet member 36. The mounting plate 35 has a downwardly facing circular groove 37 which receives balls 39. The balls 39 also run in the groove 31. The structure described to this point can be of usual construction.

The floor panel 16 is supported in spaced relation above the mounting plate 35 by resilient corner mounting blocks 41, 41A, 41B and 41C (FIG. 2) which are mounted on opposed corners of the mounting plate 35 at which edges thereof intersect. Details of construction of the mounting block 41 are shown in FIGS. 2, 3, 5 and 6, the other mounting blocks being of similar construction. The mounting block 41 is formed of rubber or other viscoelastic rubber-like material and is provided with parallel upper and lower faces 42 and 43. A slot 46 is formed in the mounting block 41. The slot 46 is parallel to and spaced between the upper and lower faces 42 and 43 and receives a corner portion 47 of the mounting plate 35. The height of the slot 46 is substantially equal to the thickness of the corner portion 47. The slot 46 divides the major portion of the mounting block 41 into an upper flange 146 and a lower flange 246. Side faces 48 and 49 of the mounting block 41 meet at right angles, and the slot 46 terminates short of the side faces 48 and 49 to provide wall portions 51 and 52. The mounting blocks 41 and 41A are held in position by a bracket 56 (FIGS. 2 and 3), which can be attached to the underside of the floor panel 16, as by welding. The bracket 56 includes a side wall 57, which engages the side wall 49 of the mounting block 41 and a side wall 49A of the mounting block 41A. End walls 59 and 61 of the bracket 56 engage the side wall 48 of the mounting block 41 and a side wall 48A of the mounting block 41A, respectively. The bracket 56 also includes a horizontal panel 62, which underlies the lower face 43 of the mounting block 41 and a similar lower face (not shown) of the mounting block 41A. the spacing between the underside of the floor panel 16 and the upper face of the horizontal panel 62 is less than the height of the mounting blocks 41 and 41A so that the flanges of the mounting blocks 41 and 41A are held in compression.

The mounting blocks 41B and 41C are held in assembled relation with the mounting plate 35 and the cart 12 by a bracket 64 (FIGS. 1, 2, 4 and 7). The bracket 64 includes a main plate portion 66, a lower flange 67, upright wall members 68 and 69, and attachment flanges 71 and 72. The attachment flanges 71 and 72 are provided with upright bores 73 and 74, which receive bolts 76 and 77, respectively. The bolts 76 and 77 extend in upright bores 81 and 82, respectively, in the floor panel 16 and serve to releasably attach the bracket 64 to the underside of the floor panel 16. The lower flange 67 underlies lower faces 43B and 43C of the mounting blocks 41B and 41C, respectively, with upper faces 42B and 42C of the mounting blocks 41B and 41C, respectively, engaging the underside of the floor panel 16. Side faces 49B and 49C of the mounting blocks 41B and 41C, respectively, engage the main plate portion 66. Side faces 48B and 48C of the mounting blocks 41B and 41C engage the upright wall members 69 and 68, respectively. The spacing between the lower flange 67 of the bracket 64 and the floor panel 16 is less than the thickness of the blocks 41B and 41C so that flanges of the mounting blocks 41B and 41C are maintained in compression between the lower flange 67, the mounting plate 35 and the floor panel 16.

As the wheel 18 advances over a floor 92 (FIG. 1), irregularities in the floor can cause abrupt raising and lowering of the wheel 18 and the mounting plate 35. The viscoelastic nature of the material of the mounting blocks absorbs shocks incident to such irregularities so that the shocks are not substantially transmitted to the cart 12. The flanges of the mounting blocks are maintained in compression so that the mounting blocks can viscoelastically absorb shocks or vibrations upwardly, downwardly, and in rotation.

In the event that the mounting blocks or caster assembly require servicing or replacement, the bracket 64 can be removed to permit removal of the caster assembly 14 so that the mounting blocks or caster assembly can be removed and replaced.

The mounting blocks support the caster wheel assembly and the caster wheel viscoelastically in spaced relation to the support or floor panel 16 so that the panel 16 is viscoelastically supported in spaced relation to the wheel 18 and to a surface on which the wheel 18 rolls.

The mounting blocks have been shown in connection with a swiveling caster assembly but can be used in mounting a rigid caster assembly or wheel rig in which a wheel rotates without swiveling.

The caster mounting structure described above and illustrated in the drawings is subject to structural modification without departing from the spirit and scope of the appended claims.

Having described my invention, what I claim as new and desire to secure by Letters Patent is:

1. The combination of a cart having a substantially horizontal lower panel and a caster assembly including a caster wheel, a substantially horizontal mounting plate, and means for supporting the mounting plate above the caster wheel with a mounting structure for the caster assembly which comprises mounting block means of viscoelastic rubber-like material mounted on opposed edge portions of the mounting plate, said mounting block means including upper flange means between an upper face of the mounting plate and the lower panel and lower flange means supporting a lower face of the mounting plate, and bracket means attached to the lower panel and including means underlying the lower flange means and holding the flange means in compression against the upper and lower faces of the mounting plate, whereby the caster wheel viscoelastically supports the cart.

2. The combination of claim 1 wherein the mounting block means includes a plurality of mounting blocks, each of said mounting blocks including an upright wall portion engaging the bracket means, the flange means including spaced flanges extending from the wall portion to define a slot in which one of the edge portions of the mounting plate is received.

3. The combination of claim 1 wherein the mounting plate includes a plurality of edges meeting at corners, the mounting block means includes a mounting block mounted at each corner, each of the mounting blocks including an upright wall portion having sections meeting at the angle of the associated corner, the wall sections engaging edges of the mounting plate adjacent the associated corner, the flange means extending from the wall portion to define a slot in which one of the edge portions of the mounting plate adjacent the associated corner is received.

4. A combination as in claim 3 wherein the mounting plate is rectangular and there are four mounting blocks.

5. A combination as in claim 4 wherein the bracket means includes a first bracket section attached to the lower panel and a second bracket section releasably attached to the lower panel, each of said bracket sections including a main wall portion engaging first wall sections of a pair of the mounting blocks, a pair of side wall portions at right angles to the main wall portions and engaging second wall sections of the associated pair of mounting blocks, and a substantially horizontal flange portion underlying the lower flange means of the associated pair of mounting blocks.

6. The combination of a panel and a caster assembly for supporting the panel, the assembly including a caster wheel, a mounting plate, and means for supporting the mounting plate in spaced relation to the caster wheel with a mounting structure for the caster assembly which comprises mounting block means of viscoelastic rubber-like material mounted on opposed edge portions of the mounting plate, said mounting block means including first flange means between a face of the mounting plate and the panel and second flange means on an opposed face of the mounting plate, and bracket means attached to the panel and including means holding the second flange means in compression against the opposed face of the mounting plate and the first flange means in compression between the mounting plate and the panel, whereby the caster wheel is viscoelastically held in spaced relation to the panel.

7. The combination of a panel and a wheel rig for supporting the panel, the wheel rig including a wheel, a mounting plate, and support means carried by the mounting plate and supporting the wheel for rotation in spaced relation to the mounting plate with a mounting structure for the wheel rig which comprises mounting block means of viscoelastic rubber-like material mounted on opposed edge portions of the mounting plate, said mounting block means including first flange means between a face of the mounting plate and the panel and second flange means on an opposed face of the mounting plate, and bracket means attached to the panel and including means holding the second flange means in compression against the opposed face of the mounting plate and the first flange means in compression between the mounting plate and the panel, whereby the caster wheel is viscoelastically held in spaced relation to the panel.

* * * * *